(12) United States Patent
Chun et al.

(10) Patent No.: US 8,619,685 B2
(45) Date of Patent: Dec. 31, 2013

(54) METHOD FOR TRANSMITTING AND RECEIVING PAGING MESSAGE IN WIRELESS COMMUNICATION SYSTEM

(75) Inventors: Sung Duck Chun, Gyeonggi-do (KR); Young Dae Lee, Gyeonggi-do (KR); Sung Jun Park, Gyeonggi-do (KR)

(73) Assignee: LG Electronics Inc., Seoul (KR)

( * ) Notice: Subject to any disclaimer, the term of this patent is extended or adjusted under 35 U.S.C. 154(b) by 212 days.

(21) Appl. No.: 12/443,971

(22) PCT Filed: Oct. 2, 2007

(86) PCT No.: PCT/KR2007/004830
§ 371 (c)(1),
(2), (4) Date: Dec. 31, 2009

(87) PCT Pub. No.: WO2008/041823
PCT Pub. Date: Apr. 10, 2008

(65) Prior Publication Data
US 2010/0091720 A1    Apr. 15, 2010

Related U.S. Application Data

(60) Provisional application No. 60/827,866, filed on Oct. 2, 2006, provisional application No. 60/863,545, filed on Oct. 30, 2006.

(30) Foreign Application Priority Data

Oct. 2, 2007    (KR) ........................ 10-2007-0099286

(51) Int. Cl.
*H04W 4/00* (2009.01)

(52) U.S. Cl.
USPC .......................................... 370/329; 370/328

(58) Field of Classification Search
None
See application file for complete search history.

(56) References Cited

U.S. PATENT DOCUMENTS 4,205,200 A    5/1980    Parikh et al.
5,588,009 A    12/1996    Will (Continued)

FOREIGN PATENT DOCUMENTS

CN    1549612    11/2004
CN    1719932    1/2006

(Continued)

OTHER PUBLICATIONS

IPWIRELESS; "Layer 2 Functions for LTE"; 3GPP TSG RAN WG2 #48bis; Oct. 10, 2005; R2-052377.

(Continued)

*Primary Examiner* — Faruk Hamza
*Assistant Examiner* — Diane Lo
(74) *Attorney, Agent, or Firm* — Lee, Hong, Degerman, Kang & Waimey (57) ABSTRACT

A method to transmit and receive a paging message in a wireless communication system is provided. In a method to transmit a paging message, a Base Station transmits a paging message including identifier and location information of a UE to be paged to the UE and receives a paging response message from the UE in response to the paging message. In a method to receive a paging message, the UE switches from a dedicated frequency band for a specific service to a non-dedicated frequency band during a predetermined period or paging gap and checks whether or not a paging message has been received from the Base Station over the non-dedicated frequency band.

12 Claims, 8 Drawing Sheets

(56) References Cited

U.S. PATENT DOCUMENTS

| | | |
|---|---|---|
| 6,157,833 A | 12/2000 | Lawson-Jenkins et al. |
| 6,233,430 B1 | 5/2001 | Helferich |
| 6,324,171 B1 | 11/2001 | Lee et al. |
| 6,353,628 B1 | 3/2002 | Wallace et al. |
| 6,526,027 B1 | 2/2003 | Yeom |
| 6,567,409 B1 | 5/2003 | Tozaki et al. |
| 6,725,267 B1 | 4/2004 | Hoang |
| 6,785,256 B2 | 8/2004 | O'Neill |
| 6,795,419 B2 | 9/2004 | Parantainen et al. |
| 7,039,425 B1 | 5/2006 | Mazawa et al. |
| 7,197,317 B2 | 3/2007 | Parkvall et al. |
| 7,245,707 B1 | 7/2007 | Chan |
| 7,373,148 B2 | 5/2008 | Kim et al. |
| 7,443,813 B2 * | 10/2008 | Hwang et al. .................. 370/312 |
| 7,525,908 B2 | 4/2009 | Olsson et al. |
| 7,551,643 B2 | 6/2009 | Yeo et al. |
| 7,606,370 B2 | 10/2009 | Lillie et al. |
| 7,680,058 B2 | 3/2010 | Seurre et al. |
| 7,769,351 B2 | 8/2010 | Kwak et al. |
| 7,801,527 B2 | 9/2010 | Putcha |
| 7,864,731 B2 | 1/2011 | Forsberg |
| 7,899,451 B2 | 3/2011 | Hu et al. |
| 7,912,471 B2 | 3/2011 | Kodikara Patabandi et al. |
| 7,916,697 B2 | 3/2011 | Eklund |
| 7,958,542 B2 | 6/2011 | Herrmann |
| 8,064,676 B2 | 11/2011 | Li et al. |
| 2001/0017850 A1 | 8/2001 | Kalliokulju et al. |
| 2001/0034791 A1 | 10/2001 | Clubb et al. |
| 2001/0044322 A1 | 11/2001 | Raaf |
| 2002/0024972 A1 | 2/2002 | Yi et al. |
| 2002/0028690 A1 | 3/2002 | McKenna et al. |
| 2002/0057663 A1 | 5/2002 | Lim |
| 2002/0059464 A1 | 5/2002 | Hata et al. |
| 2002/0091860 A1 | 7/2002 | Kalliokulju et al. |
| 2002/0114294 A1 | 8/2002 | Toskala et al. |
| 2003/0007490 A1 | 1/2003 | Yi et al. |
| 2003/0007512 A1 | 1/2003 | Tourunen et al. |
| 2003/0050078 A1 * | 3/2003 | Motegi et al. .................. 455/456 |
| 2003/0119488 A1 | 6/2003 | Hans et al. |
| 2003/0123485 A1 | 7/2003 | Yi et al. |
| 2003/0125056 A1 | 7/2003 | Jiang |
| 2003/0139170 A1 | 7/2003 | Heo |
| 2003/0147371 A1 | 8/2003 | Choi et al. |
| 2003/0165122 A1 | 9/2003 | Westphal |
| 2003/0165133 A1 | 9/2003 | Garani |
| 2003/0189922 A1 | 10/2003 | Howe |
| 2003/0207696 A1 | 11/2003 | Willenegger et al. |
| 2003/0223452 A1 | 12/2003 | Toskala et al. |
| 2003/0227875 A1 | 12/2003 | Wei et al. |
| 2004/0014452 A1 | 1/2004 | Lim et al. |
| 2004/0028078 A1 | 2/2004 | Beckmann et al. |
| 2004/0039830 A1 | 2/2004 | Zhang et al. |
| 2004/0042507 A1 | 3/2004 | Pelletier et al. |
| 2004/0087320 A1 | 5/2004 | Kim et al. |
| 2004/0100940 A1 | 5/2004 | Kuure et al. |
| 2004/0117860 A1 | 6/2004 | Yi et al. |
| 2004/0121771 A1 | 6/2004 | Song et al. |
| 2004/0147269 A1 | 7/2004 | Kim |
| 2004/0148427 A1 | 7/2004 | Nakhjiri et al. |
| 2004/0180675 A1 * | 9/2004 | Choi et al. .................... 455/458 |
| 2004/0185837 A1 | 9/2004 | Kim et al. |
| 2004/0202107 A1 | 10/2004 | Bensimon et al. |
| 2004/0229605 A1 | 11/2004 | Hwang et al. |
| 2004/0233870 A1 | 11/2004 | Willenegger et al. |
| 2004/0242195 A1 | 12/2004 | Chun et al. |
| 2004/0253959 A1 | 12/2004 | Hwang et al. |
| 2005/0009527 A1 | 1/2005 | Sharma |
| 2005/0032555 A1 | 2/2005 | Jami et al. |
| 2005/0037767 A1 | 2/2005 | Kim et al. |
| 2005/0041610 A1 | 2/2005 | Lee et al. |
| 2005/0041681 A1 | 2/2005 | Lee et al. |
| 2005/0053029 A1 | 3/2005 | Lee et al. |
| 2005/0063347 A1 | 3/2005 | Sarkkinen et al. |
| 2005/0070253 A1 * | 3/2005 | Farnsworth et al. ....... 455/412.1 |
| 2005/0085254 A1 | 4/2005 | Chuah et al. |
| 2005/0094670 A1 | 5/2005 | Kim |
| 2005/0100048 A1 | 5/2005 | Chun et al. |
| 2005/0141462 A1 | 6/2005 | Aerrabotu et al. |
| 2005/0141538 A1 | 6/2005 | Beckmann et al. |
| 2005/0141541 A1 | 6/2005 | Cuny et al. |
| 2005/0160184 A1 | 7/2005 | Walsh et al. |
| 2005/0164719 A1 | 7/2005 | Waters |
| 2005/0176430 A1 | 8/2005 | Lee et al. |
| 2005/0176474 A1 | 8/2005 | Lee et al. |
| 2005/0185620 A1 | 8/2005 | Lee et al. |
| 2005/0232271 A1 | 10/2005 | Kettunen et al. |
| 2005/0238051 A1 | 10/2005 | Yi et al. |
| 2005/0249188 A1 | 11/2005 | Hayashi |
| 2005/0265294 A1 | 12/2005 | Hu et al. |
| 2005/0286470 A1 | 12/2005 | Asthana et al. |
| 2005/0288022 A1 | 12/2005 | Ryu et al. |
| 2006/0013165 A1 | 1/2006 | Choi et al. |
| 2006/0034335 A1 | 2/2006 | Karaoguz et al. |
| 2006/0039309 A1 | 2/2006 | Lee et al. |
| 2006/0067324 A1 | 3/2006 | Kim et al. |
| 2006/0067364 A1 | 3/2006 | Jung et al. |
| 2006/0087994 A1 | 4/2006 | Barth et al. |
| 2006/0098567 A1 | 5/2006 | Willenegger et al. |
| 2006/0098688 A1 | 5/2006 | Parkvall et al. |
| 2006/0126554 A1 | 6/2006 | Motegi et al. |
| 2006/0126570 A1 | 6/2006 | Kim et al. |
| 2006/0142019 A1 | 6/2006 | Kroth et al. |
| 2006/0165045 A1 | 7/2006 | Kim et al. |
| 2006/0187846 A1 | 8/2006 | Pelletier et al. |
| 2006/0195540 A1 | 8/2006 | Hamilton et al. |
| 2006/0203760 A1 | 9/2006 | Fukui et al. |
| 2006/0209870 A1 | 9/2006 | Lee et al. |
| 2006/0218271 A1 | 9/2006 | Kasslin et al. |
| 2006/0245417 A1 | 11/2006 | Conner et al. |
| 2006/0251105 A1 | 11/2006 | Kim et al. |
| 2006/0262811 A1 | 11/2006 | Jiang |
| 2007/0041349 A1 | 2/2007 | Kim et al. |
| 2007/0041382 A1 | 2/2007 | Vayanos et al. |
| 2007/0047452 A1 | 3/2007 | Lohr et al. |
| 2007/0047493 A1 | 3/2007 | Park et al. |
| 2007/0047582 A1 | 3/2007 | Malkamaki |
| 2007/0060139 A1 | 3/2007 | Kim et al. |
| 2007/0064631 A1 | 3/2007 | Tseng et al. |
| 2007/0064665 A1 | 3/2007 | Zhang et al. |
| 2007/0155389 A1 | 7/2007 | Zhang |
| 2007/0155390 A1 | 7/2007 | Kodikara Patabandi et al. |
| 2007/0165567 A1 | 7/2007 | Tan et al. |
| 2007/0165635 A1 | 7/2007 | Zhang et al. |
| 2007/0177569 A1 | 8/2007 | Lundby |
| 2007/0178875 A1 | 8/2007 | Rao et al. |
| 2007/0206531 A1 | 9/2007 | Pajukoski et al. |
| 2007/0224993 A1 | 9/2007 | Forsberg |
| 2007/0248075 A1 | 10/2007 | Liu et al. |
| 2007/0254679 A1 | 11/2007 | Montojo et al. |
| 2007/0258591 A1 | 11/2007 | Terry et al. |
| 2007/0291634 A1 | 12/2007 | Kwon et al. |
| 2007/0291646 A1 | 12/2007 | Ohishi et al. |
| 2007/0291673 A1 | 12/2007 | Demirhan et al. |
| 2007/0291695 A1 | 12/2007 | Sammour et al. |
| 2007/0291719 A1 | 12/2007 | Demirhan et al. |
| 2007/0291728 A1 | 12/2007 | Dalsgaard et al. |
| 2007/0291729 A1 | 12/2007 | Dalsgaard et al. |
| 2007/0291788 A1 | 12/2007 | Sammour et al. |
| 2007/0293224 A1 | 12/2007 | Wang et al. |
| 2008/0004058 A1 | 1/2008 | Jeong et al. |
| 2008/0009289 A1 | 1/2008 | Kashima et al. |
| 2008/0043619 A1 | 2/2008 | Sammour et al. |
| 2008/0056198 A1 | 3/2008 | Charpentier et al. |
| 2008/0056273 A1 | 3/2008 | Pelletier et al. |
| 2008/0064390 A1 | 3/2008 | Kim |
| 2008/0076359 A1 | 3/2008 | Charpentier et al. |
| 2008/0089285 A1 | 4/2008 | Pirskanen et al. |
| 2008/0089292 A1 | 4/2008 | Kitazoe et al. |
| 2008/0095185 A1 | 4/2008 | DiGirolamo et al. |
| 2008/0101268 A1 | 5/2008 | Sammour et al. |
| 2008/0167089 A1 | 7/2008 | Suzuki et al. |
| 2008/0181127 A1 | 7/2008 | Terry et al. |
| 2008/0182594 A1 | 7/2008 | Flore et al. |
| 2008/0186946 A1 | 8/2008 | Marinier et al. |

(56) References Cited

U.S. PATENT DOCUMENTS

| | | |
|---|---|---|
| 2008/0188223 A1 | 8/2008 | Vesterinen et al. |
| 2008/0225744 A1 | 9/2008 | DiGirolamo et al. |
| 2008/0225765 A1 | 9/2008 | Marinier et al. |
| 2008/0240439 A1 | 10/2008 | Mukherjee et al. |
| 2008/0259912 A1 | 10/2008 | Wang et al. |
| 2008/0267126 A1 | 10/2008 | Vujcic et al. |
| 2008/0267405 A1 | 10/2008 | Vialen et al. |
| 2008/0268850 A1 | 10/2008 | Narasimha et al. |
| 2008/0273610 A1 | 11/2008 | Malladi et al. |
| 2008/0280567 A1 | 11/2008 | Sharma |
| 2008/0285691 A1 | 11/2008 | Onggosanusi et al. |
| 2008/0287091 A1 | 11/2008 | Suzuki et al. |
| 2008/0287129 A1 | 11/2008 | Somasundaram et al. |
| 2008/0310452 A1 | 12/2008 | Vedantham et al. |
| 2008/0316959 A1 | 12/2008 | Bachl et al. |
| 2009/0005051 A1 | 1/2009 | Voyer et al. |
| 2009/0022107 A1 | 1/2009 | Kapoor et al. |
| 2009/0034466 A1 | 2/2009 | Lindskog et al. |
| 2009/0040982 A1 | 2/2009 | Ho et al. |
| 2009/0086659 A1 | 4/2009 | Pani et al. |
| 2009/0086710 A1 | 4/2009 | Ho |
| 2009/0092076 A1 | 4/2009 | Zheng et al. |
| 2009/0109912 A1 | 4/2009 | DiGirolamo et al. |
| 2009/0124259 A1 | 5/2009 | Attar et al. |
| 2009/0143074 A1 | 6/2009 | Pelletier et al. |
| 2009/0163199 A1 | 6/2009 | Kazmi et al. |
| 2009/0175183 A1 | 7/2009 | Mochizuki et al. |
| 2009/0181710 A1 | 7/2009 | Pani et al. |
| 2009/0207771 A1 | 8/2009 | Lindskog et al. |
| 2009/0239538 A1 | 9/2009 | Motegi et al. |
| 2009/0264164 A1 | 10/2009 | Chun et al. |
| 2009/0318170 A1 | 12/2009 | Lee et al. |
| 2010/0027413 A1 | 2/2010 | Park et al. |
| 2010/0046384 A1 | 2/2010 | Lee et al. |
| 2010/0061285 A1 | 3/2010 | Maeda et al. |
| 2010/0061330 A1 | 3/2010 | Hanov |
| 2010/0067495 A1 | 3/2010 | Lee et al. |
| 2010/0075635 A1 | 3/2010 | Lim et al. |
| 2010/0128669 A1 | 5/2010 | Chun et al. |
| 2010/0137016 A1 | 6/2010 | Voyer |
| 2010/0165901 A1 | 7/2010 | Kim |
| 2010/0195568 A1 | 8/2010 | Iimori |
| 2010/0227614 A1 | 9/2010 | Chun et al. |
| 2010/0238799 A1 | 9/2010 | Sebire |
| 2010/0238903 A1 | 9/2010 | Kitazoe |
| 2010/0254340 A1 | 10/2010 | Park et al. |
| 2010/0265896 A1 | 10/2010 | Park et al. |
| 2010/0272004 A1 | 10/2010 | Maeda et al. |
| 2010/0309877 A1 | 12/2010 | Damnjanovic et al. |
| 2011/0039536 A1 | 2/2011 | Lee et al. |
| 2011/0090836 A1 | 4/2011 | Mochizuki et al. |
| 2011/0116436 A1 | 5/2011 | Bachu et al. |
| 2011/0182243 A1 | 7/2011 | Gallagher et al. |
| 2011/0207427 A1 | 8/2011 | Kitani et al. |
| 2011/0261743 A1 | 10/2011 | Futaki et al. |
| 2012/0002589 A1 | 1/2012 | Saifullah et al. |

FOREIGN PATENT DOCUMENTS

| | | |
|---|---|---|
| CN | 1731887 | 2/2006 |
| CN | 1751460 | 3/2006 |
| CN | 1835627 | 9/2006 |
| EP | 0889664 | 1/1999 |
| EP | 1148753 | 10/2001 |
| EP | 1168877 | 1/2002 |
| EP | 1209938 | 5/2002 |
| EP | 1304898 | 4/2003 |
| EP | 1315356 | 5/2003 |
| EP | 1318632 | 6/2003 |
| EP | 1337124 | 8/2003 |
| EP | 1372310 | 12/2003 |
| EP | 1420551 | 5/2004 |
| EP | 1501328 | 1/2005 |
| EP | 1511245 | 3/2005 |
| EP | 1720322 | 11/2006 |
| EP | 1720373 | 11/2006 |
| JP | 6006294 | 1/1994 |
| JP | 2002-539686 | 11/2002 |
| JP | 2003-504935 | 2/2003 |
| JP | 2003087180 | 3/2003 |
| JP | 2003196775 | 7/2003 |
| JP | 2003235064 | 8/2003 |
| JP | 2004-134904 | 4/2004 |
| JP | 2005-039726 | 2/2005 |
| JP | 2005057787 | 3/2005 |
| JP | 2005-354488 | 12/2005 |
| JP | 2006-505979 | 2/2006 |
| JP | 2006-067115 | 3/2006 |
| JP | 2006528456 | 12/2006 |
| JP | 2007165635 | 6/2007 |
| JP | 2008535370 | 8/2008 |
| JP | 2009540721 | 11/2009 |
| JP | 2009542100 | 11/2009 |
| KR | 1020010015234 | 2/2001 |
| KR | 1020010105240 | 11/2001 |
| KR | 1020030026924 | 4/2003 |
| KR | 10-2004-0039944 | 5/2004 |
| KR | 1020040048675 | 6/2004 |
| KR | 10-2005-0008440 | 1/2005 |
| KR | 1020050027972 | 3/2005 |
| KR | 10-2005-0096763 | 10/2005 |
| KR | 10-2005-0100552 | 10/2005 |
| KR | 10-2006-0024756 | 3/2006 |
| RU | 2249917 | 4/2005 |
| WO | 200074416 | 12/2000 |
| WO | 0239622 | 5/2002 |
| WO | 02/091659 | 11/2002 |
| WO | 03/100988 | 12/2003 |
| WO | 2004043094 | 5/2004 |
| WO | 2004-064272 | 7/2004 |
| WO | 2004/102833 | 11/2004 |
| WO | 2005/048613 | 5/2005 |
| WO | 2005/067262 | 7/2005 |
| WO | 2005/122616 | 12/2005 |
| WO | 2006000876 | 1/2006 |
| WO | 2006/018670 | 2/2006 |
| WO | 2006011763 | 2/2006 |
| WO | 2006049441 | 5/2006 |
| WO | 2006/075820 | 7/2006 |
| WO | 2006/109851 | 10/2006 |
| WO | 2006104344 | 10/2006 |
| WO | 2006/116620 | 11/2006 |
| WO | 2007025138 | 3/2007 |
| WO | 2007052888 | 5/2007 |
| WO | 2007-078929 | 7/2007 |
| WO | 2007078155 | 7/2007 |
| WO | 2007078172 | 7/2007 |
| WO | 2007133034 | 11/2007 |
| WO | 2008/042889 | 4/2008 |
| WO | 2008/096984 | 8/2008 |
| WO | 2008111684 | 9/2008 |
| WO | 2009084998 | 7/2009 |

OTHER PUBLICATIONS

Samsung Electronics Co., LTD.; "Selective Forwarding/Retransmission During HO"; 3GPP TSG-RAN2 #56bis; Jan. 15, 2007; R2-070130.

Samsung Electronics Co., LTD., "Re-use of PDCP SN at ARQ Level" 3GPP TSG-RAN2 #53; Jun. 27, 2006; R2-061829.

NTT DoCoMo, Inc., "MAC PDU Structure for LTE," 3GPP TSG RAN WG2 #56bis, R2-070280, Jan. 2007, XP-050133369.

Catt et al., "Enhancement to Buffer Status Reporting," 3GPP TSG-RAN WG2 #57bis, R2-071345, Mar. 2007, XP-050134291.

LG Electronics Inc., "Contents of PDCP Status Report," R2-07xxxx, 3GPP TSG-RAN WG2 #59, Oct. 2007, XP-002580785.

LG Electronics Inc., "PDCP Retransmissions," R2-073041, 3GPP TSG-RAN WG2 #59, Aug. 2007, XP-050135778.

LG Electronics Inc., "PDCP Structure and Traffic Path," R2-073259, 3GPP TSG-RAN WG2 #59, Aug. 2007, XP-050135985.

Panasonic, "MAC PDU Format for LTE," 3GPP TSG RAN WG2#56bis, Jan. 15, 2007, Doc. No. R2-070096.

(56) References Cited

OTHER PUBLICATIONS

LG Electronics Inc., "Relative Buffer Status Reporting," 3GPP TSG RAN WG2#46bis, Apr. 4, 2005, Doc. No. R2-050852.
Sammour, M.; "Method and System Enhancing for Discontinuous Reception in Wireless Systems"; U.S. Appl. No. 60/863,185; Oct. 27, 2005.
Gao, Y., et al., "Research on the Access Network and MAC Technique for Beyond 3G Systems," IEEE Wireless Communications, vol. 14, No. 2, pp. 57-61, Apr. 2007.
3rd Generation Partnership Project (3GPP), "Medium Access Control (MAC) Protocol Specification," Technical Specification, 3GPP TS 25.321, V.7.4.0, Mar. 2007, XP-050367709.
ASUSTeK, "Granularity Consideration for Variable RLC PDU Sizes," R2-070336, 3GPP TSG-RAN WG2 Meeting #56bis, Jan. 15, 2007, XP-050133423.
Bosch, "Header Compression Signaling," TSGR2#9(99)i32, TSG-RAN Working Group 2 (Radio Layer 2 and Radio Layer 3), Nov. 29, 1999, XP-050114120.
3rd Generation Partnership Project (3GPP), "Packet Data Convergence Protocol (PDCP) Specification," Technical Specification, 3GPP TS 25.323, V.7.4.0, Mar. 2007, XP-050367856.
LG Electronics Inc., "UL Timing Control Related to Contention Resolution," R2-081607, 3GPP TSG RAN WG2 #61bis, Mar. 2008, XP-050139334.
3rd Generation Partnership Project (3GPP), "Technical Specification Group Radio Access Network; Evolved Universal Terrestrial Radio Access (E-UTRA) Medium Access Control (MAC) Protocol Specification (Release 8)," 3GPP TS 36.321, v8.1.0, Mar. 2008, XP-050377617.
Nokia, Requirements for redirection in E-UTRAN, 3GPP TSG-RAN WG2 Meeting #56-bis, R2-070107, Sorrento, Italy, Jan. 15, 2007.
Nokia, "Active Mode DRX," 3GPP TSG-RAN WG2 Meeting #55, R2-062752, Oct. 200, XP002437990.
NTT Docomo Inc, "Views on DRX/DTX control in LTE," 3GPP TSG RAN WG2 #56, R2-063397, Nov. 2006, XP050132870.
Email Rapporteur (Nokia), "DRX in E-UTRAN", 3GPP TSG-RAN WG2 Meeting #57, R2-070463, Feb. 2007, XP050133530.
Ericsson, "Mac header for Improved L2 support for high data rates," R2-070810, 3GPP TSG-RAN WG2 #57, Feb. 2007, XP-050133836.
Alcatel-Lucent, "DL Control Signaling and Multiplexing for VOIP," R1 -071721, 3GPP TSG RAN WG1 Meeting #48bis, Mar. 2007,XP-002460800.
Nokia Corporation et al., "MAC Header Format," R2-073891, 3GPP TSG-RAN WG2 Meeting #59bis, Oct. 2007, XP-002602993.
LG Electronics Inc., "Support for VoIP Over MAC-HS/EHS," R2-071542, 3GPP TSG-RAN WG2 #57bis, Mar. 2007, XP-050134474.
Samsung, "LTE Random access procedure," R2-062258, 3GPP TSG RAN2#54, Aug. 2006.
IPWireless "Contention Resolution in Non-synchronous RACH Access," R2-062269, RAN2#54, Aug. 2006.
Ericsson, "Initial Random Access Procedure for E-UTRAN," R2-062853, 3GPP TSG-RAN WG2 #55, Oct. 2006.
Siemens, "Initial Access Procedure," R2-061931, 3GPP TSG-RAN WG2 LTE AdHoc Meeting, Jun. 2006.
LG Electronics, "Discussion on Message 4 in Random Access", R2-070519, 3GPP TSG-RAN WG2 #57, Feb. 2007.
LG Electronics, "Discussion on Message 4 in Random Access", R2-071456, 3GPP TSG-RAN WG2 #57bis, Mar. 2007.
LG Electronics, "Discussion on Message 4 in Random Access", R2-071923, 3GPP TSG-RAN WG2 #58, May 2007.
NTT Docomo, Inc., "E-mail Discussion on U-plane ciphering location for LTE", R2-071293, 3GPP TSG RAN WG2#57bis, Mar. 2007.
LG Electronics, "U-plane ciphering at MAC/Physical Layer", R2-071550, 3GPP TSG RAN WG2#57bis, Mar. 2007.
LG Electronics, "DRX Scheme", R2-070265, 3GPP TSG-RAN WG2 #56bis, Jan. 2007.
Nokia, "Discontinuous reception in CELL_FACH", R2-071403, 3GPP TSG-RAN WG2 Meeting #58, Mar. 2007.
LG Electronics, "Multi-level DRX Operation in CELL_PCH", R2-071930, 3GPP TSG-RAN WG2 #58, May 2007.
NEC, "Fast setup for PS services (Cell PCH & URA PCH)", R2-062328, 3GPP TSG-RAN2 Meeting #54, Aug. 2006.
CATT, "Non-synchronized access and C-RNTI allocation," R2-062933, 3GPP TSG-RAN WG2#55, Oct. 2006.
U.S. Appl. No. 12/602,762, Final Office Action dated Dec. 7, 2012, 11 pages.
QUALCOMM Europe, "Open issues in random access procedure", R2-063034, 3GPP Tsg-Ran WG2 #55, Oct. 2006, 3 pages.
Taiwan Intellectual Property Office Application Serial No. 096140865, Search Report dated Feb. 6, 2013, 6 pages.
European Patent Office Applilcation Serial No. 07833694.8, Search Report dated Mar. 1, 2013, 8 pages.
European Patent Office Application Serial No. 07833143.6, Search Report dated Mar. 5, 2013, 10 pages.
U.S. Appl. No. 12/438,523, Final Office Action dated Jan. 22, 2013, 11 pages.
Korean Intellectual Property Office Application Serial No. 10-2007-0012749, Notice of Allowance dated Jan. 18, 2013, 2 pages.
Samsung, "Contention resolution in aRACH," 3GPP TSG-RAN WG2 #57bis, R2-071386, Mar. 2007, 4 pages.
TD Tech, "Contention Resolution and Initial Random Access," 3GPP TSG-RAN WG2 #57, R2-070910, Feb. 2007, 7 pages.
IPWireless, "Initial Access Procedure and C-RNTI Allocation," 3GPP TSG RAN WG2 #56bis, R2-070301, Jan. 2007, 4 pages.
U.S. Appl. No. 12/113,816, Final Office Action dated May 6, 2013, 30 pages.
Ericsson, "Initial, Random Access and Identity Handling," TSG-RAN WG2 Meeting #51, Tdoc R2-060592, Feb. 2006, 7 pages.
European Patent Office Application Serial No. 07833692.2, Search Report dated May 7, 2013, 7 pages.
LG Electronics, "Initial access procedure," 3GPP TSG RAN WG2#Ad Hoc on LTE, R2-061986, Jun. 2006, 6 pages.
Taiwan Intellectual Property Office Application Serial No. 096140865, Office Action dated May 6, 2013, 6 pages.
3rd Generation Partnership Project (3GPP), "Technical Specification Group Radio Access Network; Evolved Universal Terrestrial Radio Access (E-UTRA) and Evolved Universal Terrestrial Radio Access Network (E-UTRAN); Radio interface protocol aspects (Release 7)," 3GPP TT 25.813 V7.0.0, Jun. 2006, 39 pages.
Ericsson, "DRX and DTX in LTE_Active," TSG-RAN WG2 Meeting #52, Tdoc R2-060967, Mar. 2006, 5 pages.
U.S. Appl. No. 12/438,523, Office Action dated May 23, 2013, 12 pages.
ZTE, "MAC state transition," 3GPP TSG RAN WG2 #50, Tdoc R2-060064, Jan. 2006, 2 pages.
Email rapporteur (NEC), "Summary of email discussion on DRX control," 3GPP Draft RAN 2 #57bis, XP050602959, Mar. 2007, 34 pages. (relevant pages: p. 3).
European Patent Office Application Serial No. 13164854.5, Search Report dated Jul. 16, 2013, 9 pages.
European Patent Office Application Serial No. 08753282.6, Search Report dated Jul. 26, 2013, 10 pages.
Nokia, "Active Mode DRX," 3GPP TSG-RAN WG2 Meeting #55, R2-062752, Oct. 2006, 3 pages.
European Patent Office Application Serial No. 13164857.8 Search Report dated Jul. 24, 2013, 7 pages.
Samsung, "LTE Handover procedures, text proposal", R2-061338, 3GPP TSG-RAN3 Meeting #53, May 2006, 14 pages.
Samsung, "UL Timing Sync Procedure", R2-0601006, 3GPP TSG RAN2#52, Mar. 2006, 4 pages, XP-002434793.
European Patent Office Application Serial No. 07793615.1, Search Report dated Feb. 18, 2013, 7 pages.
U.S. Appl. No. 12/113,816, Office Action dated Aug. 2, 2013, 30 pages.
European Patent Office Application Serial No. 07833705.2, Search Report dated Sep. 3, 2013, 5 pages.
United States Patent and Trademark Office U.S. Appl. No. 12/113,816, Final Office Action dated Sep. 30, 2013, 20 pages.

(56) References Cited

OTHER PUBLICATIONS

Siemens, "ARQ operation and HARQ," 3GPP TSG-RAN WG2 #55, R2-062843, Oct. 2006, 4 pages.
European Patent Office Application Serial No. 08766418.1, Search Report dated Oct. 10, 2013, 7 pages.
NEC, "Fast setup for PS services (CELL PCH & URA PCH)," 3GPP TSG-RAN2 Meeting #53, Tdoc R2-061124, May 2006, 5 pages.
LG Electronics, "DRX Scheme," 3GPP TSG-RAN WG2 #56, R2-063248, Nov. 2006, 4 pages.

* cited by examiner

METHOD FOR TRANSMITTING AND RECEIVING PAGING MESSAGE IN WIRELESS COMMUNICATION SYSTEM

CROSS-REFERENCE TO RELATED APPLICATIONS

This application is the National Stage filing under 35 U.S.C. 371 of International Application No. PCT/KR2007/004830, filed on Oct. 2, 2007, which claims the benefit of earlier filing date and right of priority to Korean Application No. 10-2007-0099286, filed on Oct. 2, 2007, and also claims the benefit of U.S. Provisional Application Ser. Nos. 60/827,866, filed on Oct. 2, 2006, and 60/863,545, filed on Oct. 30, 2006.

TECHNICAL FIELD

The present invention relates to a wireless terminal and a wireless communication system that provides wireless communication, and more particularly, to a method in which a system with two or more frequency bands provides User Equipments (UEs) with multimedia and broadcast services with a quality higher than a specific level while efficiently notifying the UEs of the presence of unicast service data when the system provides multimedia and broadcast services over one of the frequency bands.

BACKGROUND ART

Figure 1:
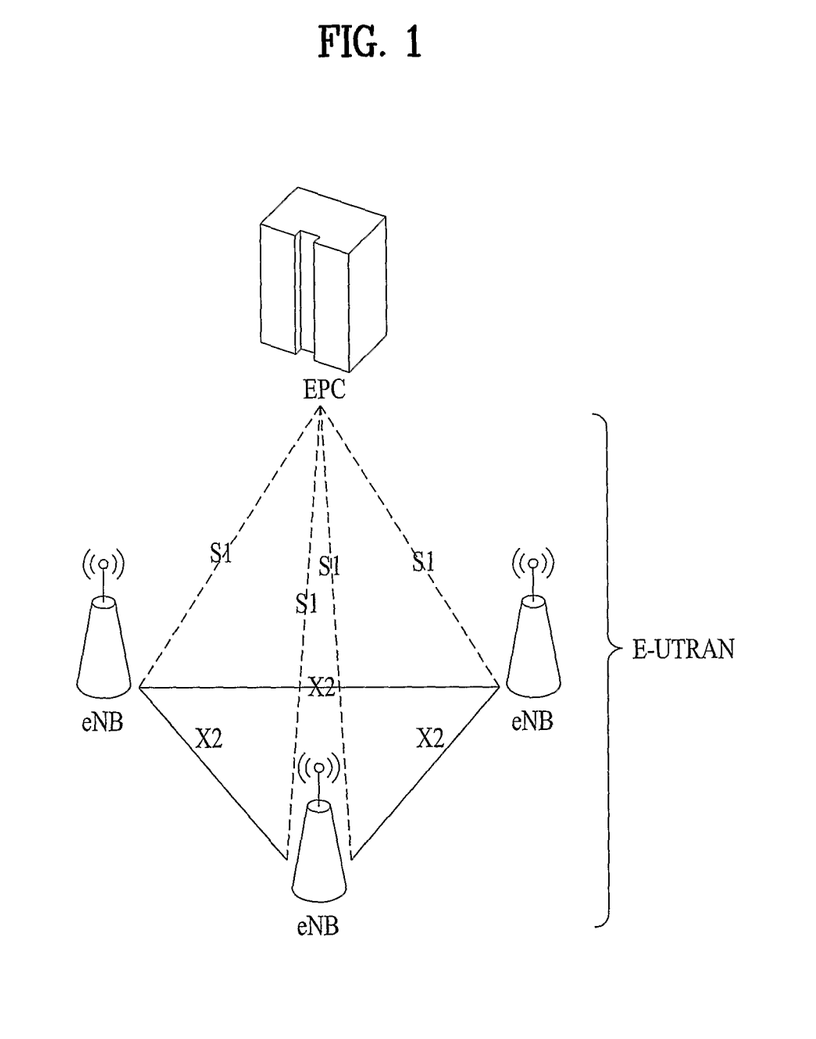
FIG. 1 illustrates a schematic structure of an Evolved Universal Terrestrial Radio Access Network (E-UTRAN)

FIG. 1 illustrates a network structure of an Evolved Universal Terrestrial Radio Access Network (E-UTRAN), which is a mobile communication system to which the related art and the present invention are applied. The E-UTRAN has been evolved from the conventional UTRAN and its basic standardization process is currently underway in 3GPP. The E-UTRAN system is also referred to as a Long Term Evolution (LTE) system.

The E-UTRAN includes base stations which will each be referred to as an eNode B or an eNB for short. The eNBs are connected through X2 interfaces. Each eNB is connected to User Equipments (UEs) and is connected to an Evolved Packet Core (EPC) through an S1 interface.

Radio interface protocol layers between UEs and the network can be divided into a L1 layer (first layer), a L2 layer (second layer), and a L3 layer (third layer) based on the lower three layers of the Open System Interconnection (OSI) reference model widely known in communication systems. A physical layer included in the first layer provides an information transfer service using a physical channel. A Radio Resource Control (RRC) layer located at the third layer controls radio resources between UEs and the network. To accomplish this, the RRC layer exchanges RRC messages between UEs and the network.

Figure 2:
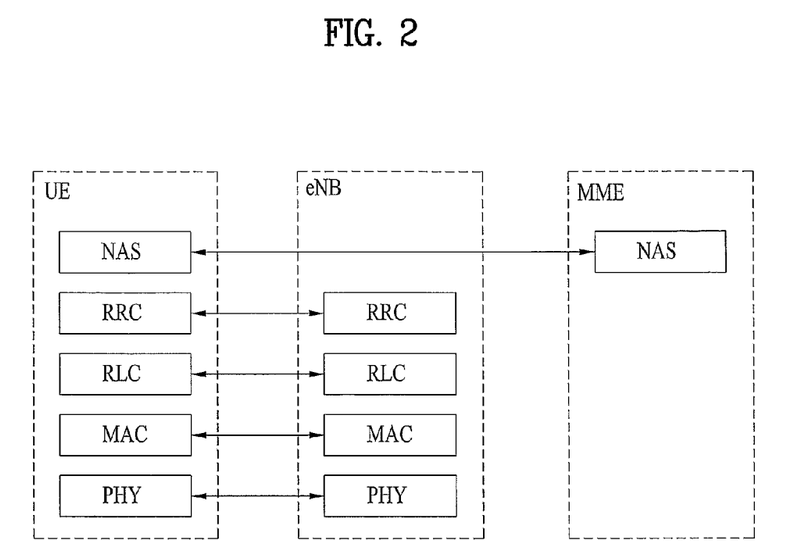
FIG. 2 illustrates a conventional radio protocol structure.

FIG. 2 illustrates a radio interface protocol structure between a UE and a UTRAN based on the 3GPP radio access network standard. The radio interface protocol of FIG. 2 is divided horizontally into a physical layer, a data link layer, and a network layer and is divided vertically into a user plane for data/information transmission and a control plane for signaling. The protocol layers of FIG. 2 can be divided into a L1 layer (first layer), a L2 layer (second layer), and a L3 layer (third layer) based on the lower three layers of the Open System Interconnection (OSI) reference model widely known in communication systems.

A physical layer, which is the first layer, provides an information transfer service to an upper layer using a physical channel. The physical layer is connected to a Medium Access Control (MAC) layer above the physical layer through a transport channel. Data is transferred between the MAC layer and the physical layer through the transport channel. Data transfer between different physical layers, specifically between the respective physical layers of transmitting and receiving ends, is performed through the physical channel. The physical channel is modulated according to the Orthogonal Frequency Division Multiplexing (OFDM) method, using time and frequencies as radio resources.

The MAC layer, which is the second layer, provides a service to a Radio Link Control (RLC) layer above the MAC layer through a logical channel. The RLC layer of the second layer supports reliable data transfer. Functions of the RLC layer may be embodied in a function block in the MAC. In this case, the RLC layer may not be provided. A PDCP layer of the second layer performs a header compression function to reduce the size of each IP packet header containing relatively large, unnecessary control information in order to efficiently transmit IP packets such as IPv4 or IPv6 packets in a radio interval with a small bandwidth.

A Radio Resource Control (RRC) layer located at the top of the third layer is defined only in the control plane and is responsible for control of logical, transport, and physical channels in association with configuration, re-configuration, and release of radio bearers (RBs). The RB is a service that the second layer provides for data communication between the UE and the UTRAN. The UE is in a connected mode if there is an RRC connection between the RRC layer of the radio network and the RRC layer of the UE. Otherwise, the UE is in an RRC idle mode.

A Non-Access Stratum (NAS) layer located above the RRC layer performs functions such as session management and mobility management.

One cell included in the eNB is set to provide a bandwidth such as 1.25, 2.5, 5, 10, or 20 MHz to provide a downlink or uplink transmission service to UEs. Here, different cells may be set to provide different bandwidths.

Downlink channels used to transmit data from the network to the UE include a Broadcast Channel (BCH) used to transmit system information, a Paging Channel (PCH) used to transmit paging messages, and a downlink Shared Channel (SCH) used to transmit user traffic or control messages. Control messages or traffic of a downlink multicast or broadcast service may be transmitted through a downlink SCH and may also be transmitted through different downlink multicast channels (MCHs). Uplink channels used to transmit data from the UE to the network include a Random Access Channel (RACH) used to transmit initial control messages and an uplink SCH used to transmit user traffic or control messages.

Examples of a logical channel, which is located above the transport channel and is mapped to the transport channel, include a Broadcast Control Channel (BCCH), a Paging Control Channel (PCCH), a Common Control Channel (CCCH), a Multicast Control Channel (MCCH), and a Multicast Traffic Channel (MTCH).

Figure 3:
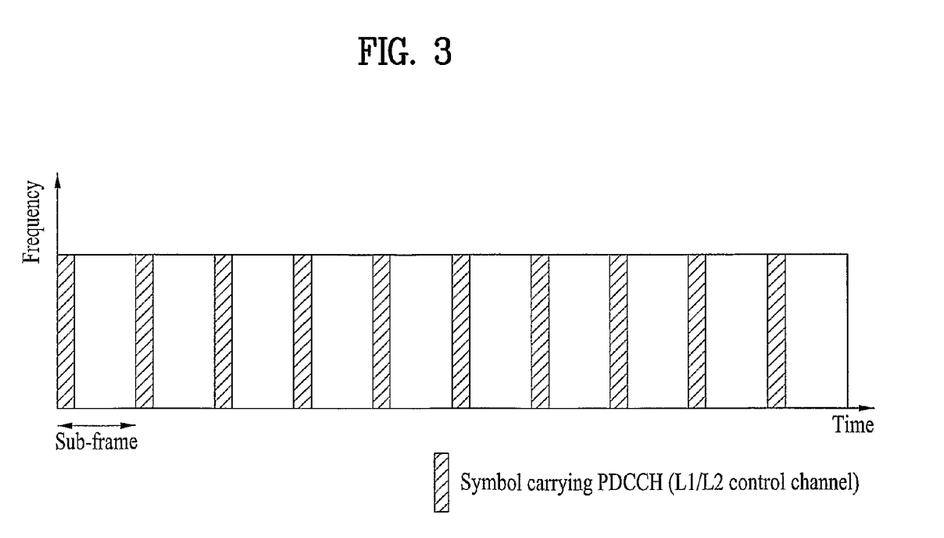
FIG. 3 illustrates conventional control channel transmission.

FIG. 3 illustrates conventional control channel transmission. The physical channel includes a number of subframes on the time domain and a number of subcarriers on the frequency domain. One subframe includes a plurality of resource blocks, each of which includes a plurality of symbols and a plurality of subcarriers. In each subframe, specific subcarriers of specific symbols (for example, the first symbol) of the subframe can be used for a Physical Downlink Control Channel (PDCCH), i.e., an L1/L2 control channel. One subframe corresponds to 0.5 ms and a Transmission Time Interval (TTI), which is a unit data transmission time, is 1 ms corresponding to two subframes.

Reference will now be made to a Multimedia Broadcast/Multicast Service (MBMS). The MBMS provides a streaming or background service to a plurality of UEs using a downlink only MBMS bearer service.

The MBMS is divided into a broadcast mode and a multicast mode. The MBMS broadcast mode is a service of transmitting multimedia data to all users in a broadcast area where a broadcast service is available. The MBMS multicast mode is a service of transmitting multimedia data to a specific user group in a multicast area where a multicast service is available.

Figure 4:
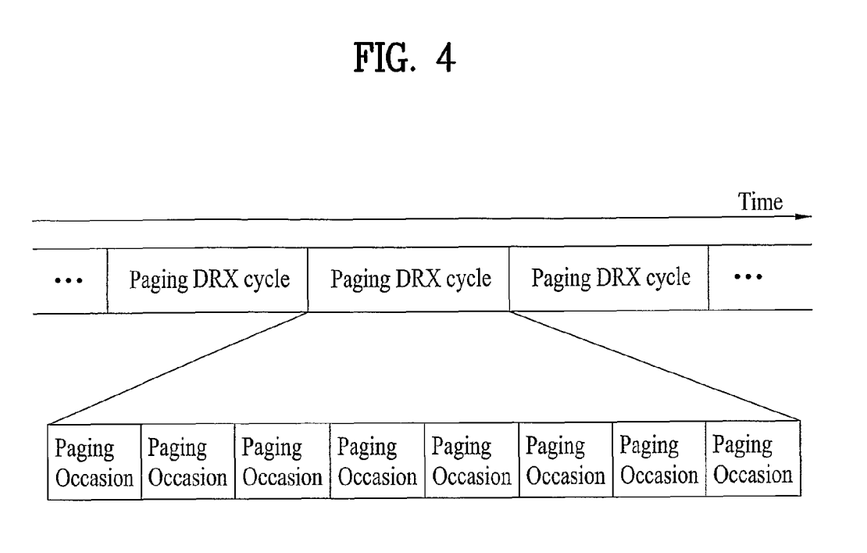
FIG. 4 illustrates conventional paging channel transmission.

Conventional paging channel transmission will now be described with reference to FIG. 4. When receiving a paging message, the UE can perform Discontinuous Reception (DRX) in order to reduce power consumption. To accomplish this, the network constructs a number of paging occasions in each period of time, which is referred to as a paging DRX cycle, and a specific UE receives a specific paging occasion to obtain a paging message. The UE receives no paging channel at any time other than the specific paging occasion. One paging occasion corresponds to one TTI.

The following is a description of an MBMS dual layer service. The network may have one or more frequency bands in one area. However, if the respective ranges of the cells of two frequency bands are identical, it is inefficient to transmit the same MBMS service over each of the frequencies. To solve this, if a plurality of frequency bands are available, the eNB allocates a specific one of the frequency bands exclusively to the MBMS to provide an MBMS service over the specific frequency band and to provide other services of each UE (for example, a unicast service) over the other frequencies.

That is, when a number of frequency bands are available, in order to increase the efficiency of the provision of the MBMS service, the eNB sets one of the frequency bands as an MBMS dedicated layer (or frequency band) so that only the MBMS service is allowed to be provided over the MBMS dedicated layer. In other words, the eNB does not provide a unicast service for a specific UE only over the MBMS dedicated layer to efficiently provide the MBMS service. Accordingly, channels not associated with the MBMS (for example, channels such as an RACH and a UL-SCH) are not used in the MBMS dedicated layer. Any paging message is also not transmitted over the MBMS dedicated layer.

If a number of frequency bands are available in one area and the MBMS service is provided over only one of the frequency bands, it is necessary for UEs in the area to switch to the frequency band in order to receive the MBMS service. However, each UE may desire to receive the unicast service at the same time. When receiving a unicast paging message, the UE must be able to immediately receive the paging message.

Regardless of whether or not a MBMS service is provided over a frequency band set to provide MBMS services, each UE can receive a paging message transmitted over another frequency band at any time if the UE is capable of receiving more than one frequency band at the same time.

However, while receiving the MBMS service, a single-receiver UE cannot normally receive a paging message transmitted over another frequency band if the UE is capable of receiving only one frequency band.

DISCLOSURE

Technical Problem

An object of the present invention devised to solve the problem lies on providing a paging message transmission method in which a Base Station, which has a plurality of frequency bands and provides a specific service over a dedicated frequency band, can provide a UE with a service with a quality desired by a user of the UE while efficiently transmitting a paging message to the UE.

Another object of the present invention devised to solve the problem lies on providing a paging message receiving method in which a UE, which receives a specific service over a dedicated frequency band included in the plurality of frequency bands, can receive a service with a quality desired by a user of the UE while efficiently receiving a paging message.

Technical Solution

The first object of the present invention can be achieved by providing a method to transmit a paging message to a User Equipment (UE) in a wireless communication system, the UE receiving a service of a dedicated frequency band, the method including a Base Station transmitting a paging message including identifier and location information of a UE to be paged to the UE, and receiving a paging response message from the UE in response to the paging message.

Preferably, the location information includes information of one of a plurality of tracking areas included in a cell of the dedicated frequency band.

Preferably, in the process of transmitting the paging message to the UE, the Base Station transmits the paging message to the UE in a different paging interval according to the location information of the UE.

The first object of the present invention can also be achieved by providing a method to transmit a paging message to a User Equipment (UE) in a wireless communication system, the UE receiving a service of a dedicated frequency band, the method including a Base Station transmitting data of the service of the dedicated frequency band to a UE having information of a paging gap, and suspending transmitting the data during an interval of the paging gap and transmitting a paging message to the UE.

Preferably, the information of the paging gap is transmitted to the UE through one of an MCCH or an MSCH.

The second object of the present invention can be achieved by providing a method of a User Equipment (UE) to receive a paging message in a wireless communication system, the UE receiving a service of a dedicated frequency band, the method including the UE receiving a paging message including identifier and location information of the UE from a Base Station, and transmitting a paging response message to the Base Station if the location information included in the paging message is identical to registered location information.

Preferably, the method further includes checking system information of the dedicated frequency band and registering location information of the UE if a location area included in the cell does not include the registered location information.

The second object of the present invention can also be achieved by providing a method of a User Equipment (UE) to receive a paging message in a wireless communication system, the UE receiving a service of a dedicated frequency band, the method including the UE switching from a dedicated frequency band for the service to a non-dedicated frequency band according to a predetermined period, and checking whether or not a paging message has been received from a Base Station over the non-dedicated frequency band.

Preferably, in the process in which the UE switches from the dedicated frequency band to the non-dedicated frequency band, the UE transmits information of the predetermined period to the Base Station.

Preferably, the predetermined period is information transmitted from the Base Station to the UE.

Preferably, the UE switches from the dedicated frequency band to the non-dedicated frequency band without receiving a BCH.

The second object of the present invention can also be achieved by providing a method of a User Equipment (UE) to receive a paging message in a wireless communication system, the UE receiving a service of a dedicated frequency band, the method including the UE switching from a dedicated frequency band for the service to a non-dedicated frequency band during an interval of a paging gap, and checking whether or not a paging message has been received from a Base Station over the non-dedicated frequency band.

Preferably, the paging gap is defined for each MBMS service or each MBMS dedicated layer.

Advantageous Effects

According to the invention, a UE can receive a paging message while receiving a specific service over a frequency band dedicated to the specific service without reducing the quality of the service and a Base Station can determine appropriate timing of paging without reducing the quality of the service provided to a UE for appropriate paging.

MODE FOR INVENTION

Reference will now be made in detail to the preferred embodiments of the present invention. The embodiments of the invention can be modified into various other forms and the scope of the invention is not limited to the embodiments described below.

In the following description, it is assumed for ease of explanation that a specific service, which each UE receives from a Base Station using a dedicated frequency band, is an MBMS service. The invention can be applied not only to a wireless communication system that provides the MBMS service but also to any wireless communication system that provides services to UEs over a dedicated frequency band.

Figure 5:
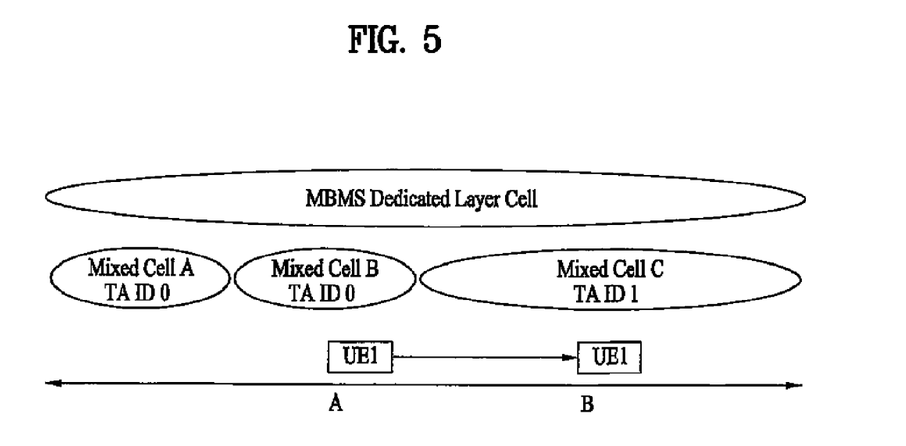
FIG. 5 illustrates an example cell size of an MBMS dedicated layer (or frequency band) and an example cell size of a general frequency band.

One embodiment of the invention suggests that a Base Station transmits a paging message to a UE over a specific MBMS dedicated frequency band (or layer) through which only MBMS services are provided. However, in this process, the size of a cell in the MBMS dedicated layer is much greater than the size of a cell in a frequency band other than the MBMS dedicated layer. For example, as shown in FIG. 5, an MBMS dedicated layer cell may be greater than the total of a number of cells (Mixed Cell A, Mixed Cell B, and Mixed Cell C) in a general frequency band. In FIG. 5, a UE1 is still in the MBMS dedicated layer cell although it has moved from a position A in the mixed cell B to a position B in the mixed cell C. In this case, transmitting a paging message over the MBMS dedicated layer causes problems. For example, let us assume that a UE having a serial No. 3333 is located in each of the mixed cell A and the mixed cell C. In this case, when a UE with the serial No. 3333 is paged over the MBMS dedicated layer, both the UEs in the cells A and C will respond to the paging. This makes the paging message indefinite.

Accordingly, when the Base Station transmits paging messages over the MBMS dedicated layer, the Base Station also needs to notify each UE of information of the tracking area (TA) where a UE to be paged by each paging message is located. This is because the ID of each UE is allocated on a TA basis.

Figure 6:
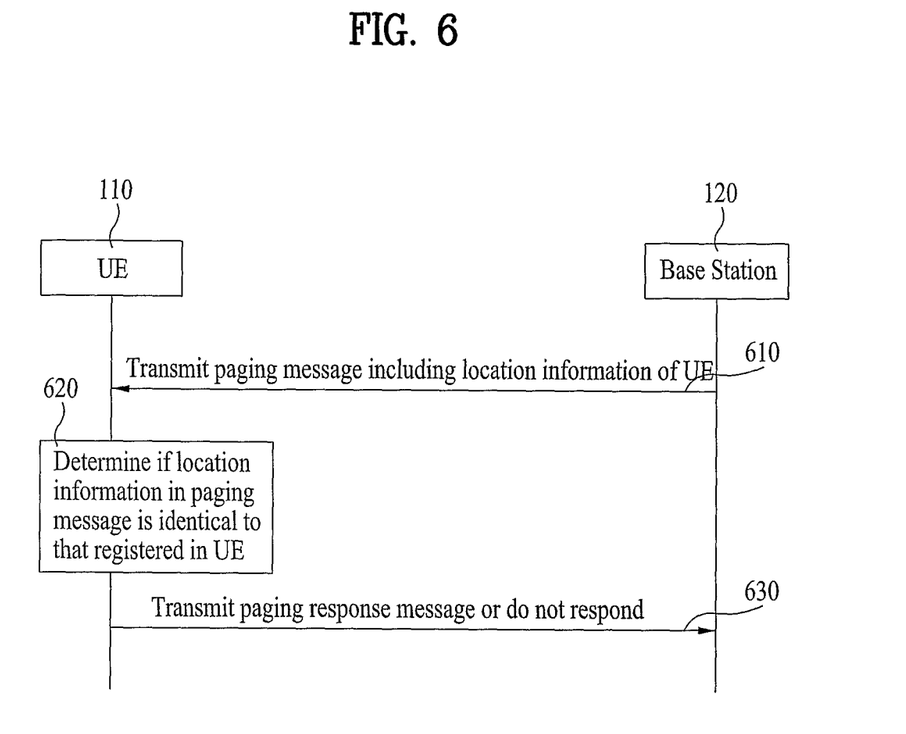
FIG. 6 is a signal flow diagram of a method to transmit and receive a paging message according to an embodiment of the invention.

FIG. 6 is a signal flow diagram of a method to transmit and receive a paging message according to an embodiment of the invention.

First, when a Base Station 120 also transmits a paging message, the Base Station 120 transmits information as to where a UE 110 to be paged is located together with an identifier of the UE 110 to be paged (610). That is, in this process, when transmitting a paging message, the UE also transmits location information (for example, TA information) of a UE to be paged.

Here, the Base Station 120 can set a different paging interval according to the location information. That is, the Base Station 120 can transmit a paging message using a different paging interval according to information of the locations of each UE. For example, the Base Station 120 can use subframe 0 when transmitting a paging message to a UE 110 corresponding to TA1 and can use subframe 1 when transmitting a paging message to a UE 110 corresponding to TA2. In this case, through system information, the Base Station 120 notifies UEs corresponding to different location information of a time interval in which the paging message is transmitted. When receiving information regarding the time interval from the Base Station 120, each UE 110 determines the time when the paging message is transmitted to a range in which the UE 110 is included and determines whether or not the UE 110 has received any paging message in the interval.

In the above process, the Base Station 120 transmits information as to which location information area (i.e., which TAs) the cell of the MBMS dedicated layer includes, through system information of the MBMS dedicated layer, in order to allow the UE 110 to perform a location information registration process at an appropriate time. The UE 110 checks which location area the MBMS dedicated layer cell includes through the system information and performs a new location information registration process if the location information the UE 110 has registered through another frequency band is absent.

If the UE 110, which has stayed in the MBMS dedicated layer, moves to enter a new MBMS dedicated layer cell, the UE 110 determines which location area the new MBMS dedicated layer cell includes by checking system information of the new MBMS dedicated layer cell and performs a location information registration process if the location area is different from that previously registered by the UE 110.

When receiving a paging message, the UE 110 checks whether or not the paging message includes location information. If the paging message includes location information, the UE 110 checks whether or not location information registered by the UE 110 is identical to the location information included in the paging message (620).

The UE 110 performs a process of responding to the network if the two location information are identical and does not respond if the two location information are different (630). Here, the process of responding to the network may include a process of transmitting a paging response message from the UE 110 to the Base Station 120.

Figure 7:
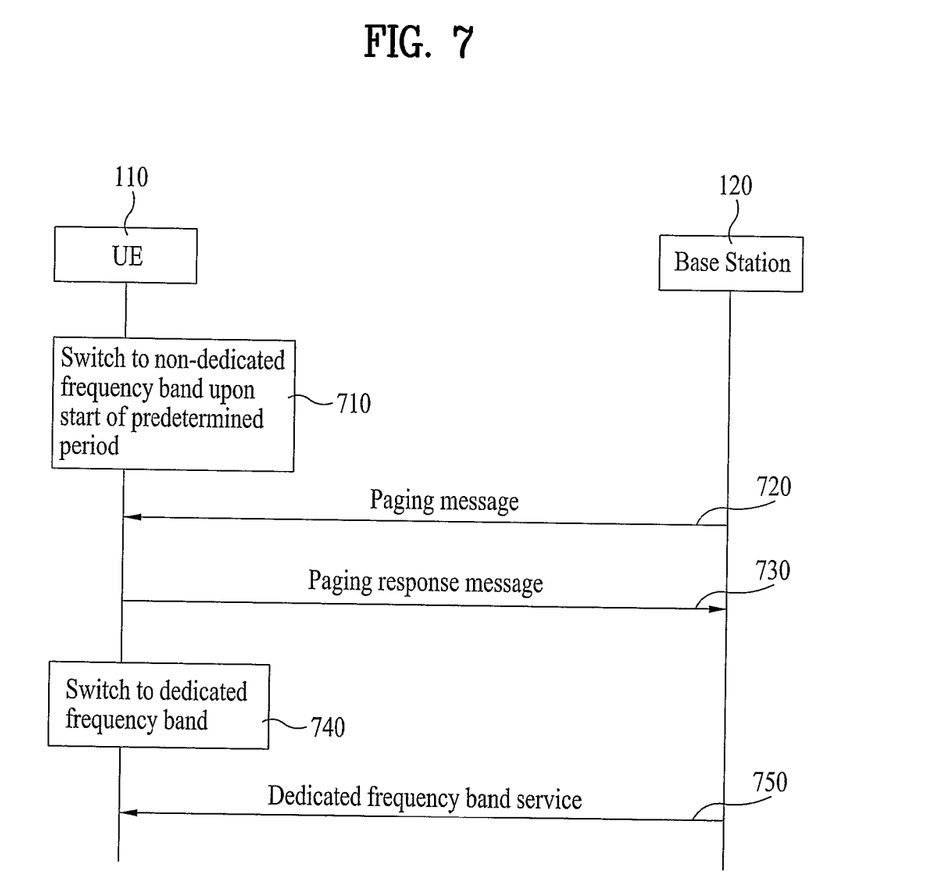
FIG. 7 is a signal flow diagram of a method to transmit and receive a paging message according to another embodiment of the invention.

FIG. 7 is a signal flow diagram of a method to transmit and receive a paging message according to another embodiment of the invention.

With reference to FIG. 7, we will describe how a single-receiver UE periodically switches between an MBMS dedicated layer and an MBMS non-dedicated layer.

The UE 110, which has been receiving an MBMS service over the MBMS dedicated layer, switches to the MBMS non-dedicated layer in each paging message check interval set in the MBMS non-dedicated layer (710) and periodically checks whether or not the UE 110 has received any paging message.

In this process 710, serious delay may occur if the UE 110 reads a BCH each time it returns to the MBMS non-dedicated layer. Thus, it is preferable that the UE 110 not read the BCH when periodically returning from the MBMS dedicated layer to the MBMS non-dedicated layer. In another embodiment of the invention, the UE 110, which has been receiving the MBMS service over the MBMS dedicated layer, does not read the BCH when it temporarily switches to the MBMS non-dedicated layer in order to check the paging message.

The UE 110 must be certain that no change has been made to a PCH setting previously known to the UE 110 when the UE 110 has been set such that it does not read the BCH when switching to the MBMS non-dedicated layer. Accordingly, if any change is made to system information or channel setting information of the MBMS non-dedicated layer cell, the MBMS dedicated layer cell notifies UEs of the change. If a UE 110 is notified of the change of the channel setting information of the MBMS non-dedicated layer cell, then the UE 110 switches to the MBMS non-dedicated layer to receive new system information. If the UE 110 moves to the cell of the MBMS non-dedicated layer in order to check paging information after the UE 110 has stayed in the MBMS dedicated layer, then the UE 110 checks a sync channel (SCH) to compare its code with the code of an SCH of a most recent cell from which the UE 110 has previously received information. If the two SCH codes are identical, the UE 110 omits the BCH reception and immediately reads a PCH or determines that it has moved to the same cell as the previous cell. The UE 110 receives system information if the two SCH codes are different.

Allowing the UE 110 to periodically switch between the MBMS dedicated layer and the MBMS non-dedicated layer makes it difficult to guarantee the MBMS service quality since the UE 110 cannot receive the MBMS service, causing losses in the MBMS service, while it is in the MBMS non-dedicated layer. In this case, we can consider a method in which the UE 110 notifies the Base Station 120 that the UE 110 is receiving an MBMS service over the MBMS dedicated layer. That is, before switching from the MBMS non-dedicated layer to the MBMS dedicated layer in order to receive the MBMS service, the UE 110 may notify the Base Station 120 that the UE 110 will switch to the MBMS dedicated layer in order to receive the MBMS service.

Together with the Base Station 120, the UE 110 can also perform resetting of paging message reception. Specifically, the UE 110 can notify the Base Station 120 of information regarding the time or intervals at which the UE 110 will again switch to the MBMS non-dedicated layer to check the paging message. Alternatively, the Base Station 120 can notify the UE 110 of the time or intervals at which the Base Station 120 transmits the paging message. That is, the UE 110 can notify the Base Station 120 of when the UE 110 receives the paging message or the Base Station 120 can notify the UE 110 of when the Base Station transmits the paging message. Based on values set in this manner, the UE 110 can periodically check the paging message in the MBMS non-dedicated layer.

If the UE 110 receives the paging message from the Base Station 120 (720), then the UE 110 performs a process of responding to the network, for example transmitting a paging response message to the Base Station 120 (730).

Regardless of whether or not the UE 110 has received the paging message, the UE 110 switches to the dedicated frequency band upon start of a specific period of time to switch to the dedicated frequency band (740).

If the UE 110 switches to the dedicated frequency band, the UE 110 receives a specific service (for example, the MBMS service) of the dedicated frequency band from the Base Station 120 (750).

Figure 8:
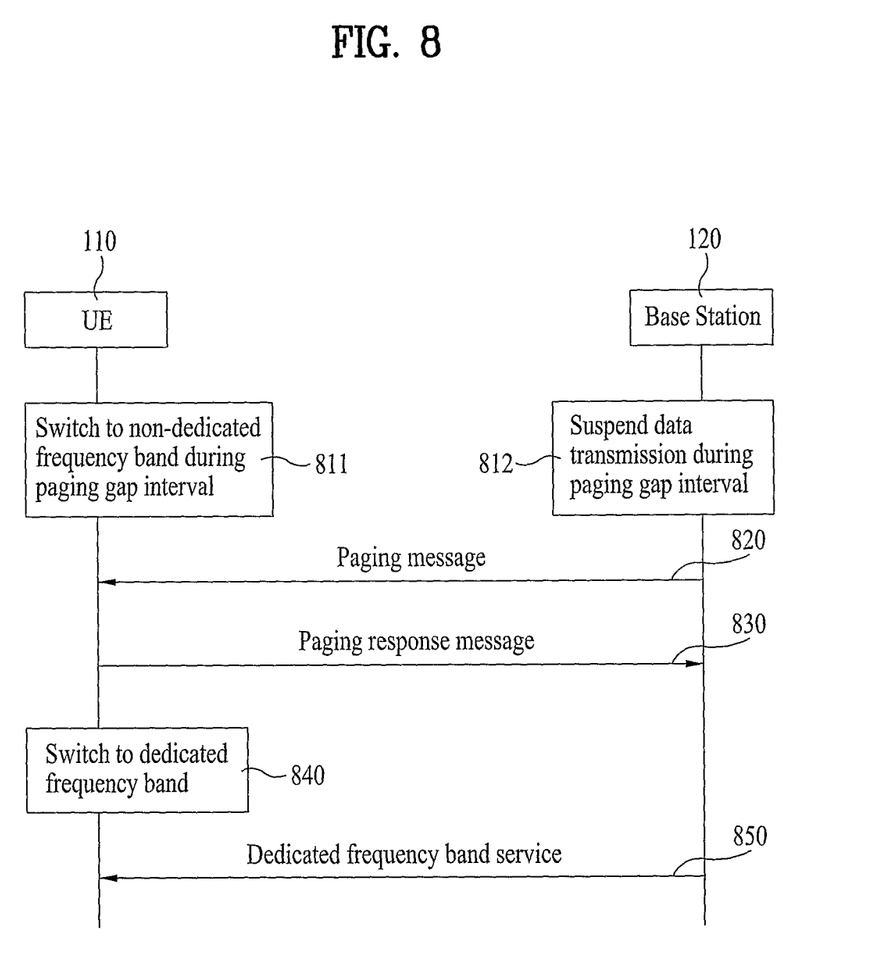
FIG. 8 is a signal flow diagram of a method to transmit and receive a paging message according to another embodiment of the invention.

FIG. 8 is a signal flow diagram of a method to transmit and receive a paging message according to another embodiment of the invention.

To accomplish the objects of the invention, this embodiment suggests a method to synchronize MBMS service data transmission over an MBMS dedicated layer with paging message transmission over an MBMS non-dedicated layer.

In the invention, the term "paging gap" refers to a time interval during which the Base Station 120 transmits no data to the UE 110 to allow the UE 110 to receive a paging message. Specifically, the paging gap is a time during which the Base Station 120 does not transmit MBMS service data over the MBMS dedicated layer so that the UE 110 receives the paging message over the MBMS non-dedicated layer.

During the paging gap, the UE 110 switches from the MBMS dedicated layer to the MBMS non-dedicated layer to check whether or not it has received any paging message (811). Here, the Base Station 120 stops MBMS service data transmission during the paging gap (812).

When receiving a paging message, the UE 110 sends a response to the paging message to the network (830).

Since the position of the paging check interval during which each UE receives the paging message is different, the time during which the paging message is transmitted to the UE 110 over the MBMS non-dedicated layer must match the paging gap in the MBMS dedicated layer. Accordingly, if the Base Station 120 receives a paging message from a Core Network (CN) in an interval other than the paging check interval originally specified for the UE 110, the Base Station 120 stores the paging message and then transmits it in the paging gap interval.

If the UE 110 has not received the paging message or after the UE 110 transmits a paging response message to the Base Station 120, the UE 110 switches to the MBMS dedicated layer (840) and receives the MBMS service (850).

However, in FIG. 8, the paging gap is applied only to a single-receiver UE which has switched to the MBMS dedicated layer in order to receive the MBMS service. For example, the paging gap is unnecessary when the UE 110 is receiving no MBMS service or when the UE 110 is a dual-receiver UE or the like. Accordingly, the network must be aware of whether or not the UE 110 is receiving an MBMS service through the MBMS dedicated layer. Thus, when transmitting a paging message to the Base Station 120, the core network transmits list information of MBMS services joined by the UE 110, together with the paging message. When the Base Station 120 transmits the paging message to the UE 110, the Base Station 120 determines, based on the list information, whether it is to transmit the paging message in the originally set paging check interval or to transmit it in the paging gap interval.

On the other hand, when the UE 110 switches to the MBMS dedicated layer in order to receive a specific MBMS service, the UE 110 can notify the Base Station 120 of information of the service which it switches to the MBMS dedicated layer in order to receive. The Base Station 120 can determine when to send the paging message to the UE 110 according to the notified information of the service to be provided to the UE 110.

Preferably, if the UE 110 decides to no longer receive the MBMS service and returns to the MBMS non-dedicated layer after switching to the MBMS dedicated layer in order to receive a specific MBMS service provided over the MBMS dedicated layer, the UE 110 notifies the Base Station 120 of the decision. That is, the UE 110 notifies the Base Station 120 of whether or not to use the paging gap. Thus, the UE can check whether or not a paging message has been received during the interval of the paging gap if the UE is set such that the paging gap is necessary for the UE and during an originally set paging check interval if it is set such that the paging gap is unnecessary for the UE.

In addition, when the UE 110 has moved from one cell to a new cell, the UE 110 can notify the previous cell that it is no longer necessary to especially consider paging timing of the UE 110 since the UE 110 has moved to another cell or the UE 110 can notify the new cell that it is necessary to consider the special paging timing of the UE 110.

In FIG. 8, the paging gap may be determined for each MBMS service and may also be determined for each MBMS dedicated layer cell. When the paging gap is determined for each MBMS dedicated layer cell, all MBMS services have the paging gap in the same time interval.

Figure 9:
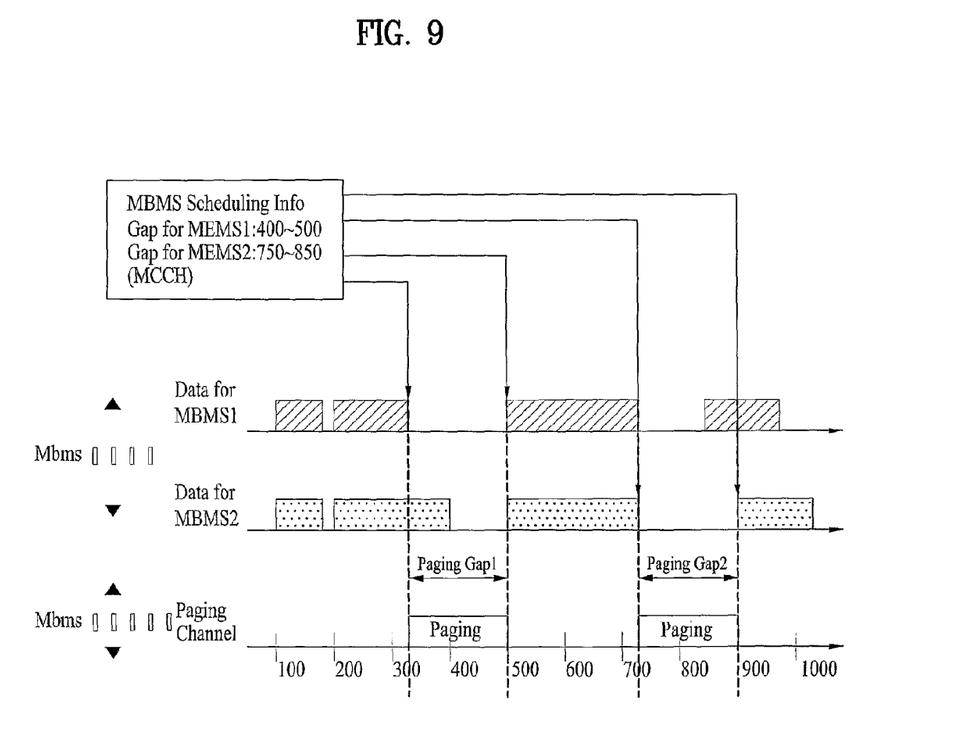
FIG. 9 illustrates an example operation of a UE of FIG. 8.

FIG. 9 illustrates an example of the operation of the UE 110 of FIG. 8.

As shown in FIG. 9, first and second MBMS services (MBMS 1 and MBMS 2) are provided over an MBMS dedicated layer, and a paging gap of the MBMS service 1 occurs between 400 ms and 500 ms and a paging gap of the MBMS service 2 occurs between 750 ms and 850 ms. Information of the paging gaps is transmitted through an MBMS Control Channel (MCCH) or an MBMS Scheduling Channel (MSCH).

If the UE 110 is receiving the MBMS service 1 in the example of FIG. 9, the UE 110 switches to an MBMS non-dedicated layer in the gap between 400 ms and 500 ms to check whether or not the UE 110 has received any paging message. The Base Station 120 transmits the paging message to the UE 110 during the interval if it is notified that the UE 110 has joined the MBMS service 1.

However, it will be difficult for the UE 110 to determine when it is to switch to the MBMS non-dedicated layer if the UE 110 has joined both the MBMS service 1 and the MBMS service 2. Accordingly, all MBMS services may have the paging gap in the same time interval.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

[Industrial Applicability]

The present invention relates to a method in which a wireless communication system with two or more frequency bands can provide User Equipments (UEs) with multimedia and broadcast services with a quality higher than a specific level while efficiently notifying the UEs of the presence of unicast service data when the system provides multimedia and broadcast services over one or more of the frequency bands. The invention is applied to devices such as a UE and a Base Station included in the wireless communication system and an algorithm using the method.

The invention claimed is:

1. A method to transmit a paging message to a User Equipment (UE) which receives a service of a dedicated frequency band in a wireless communication system, the method comprising:
    transmitting, at an eNodeB to the UE, the paging message including a UE identifier and location information of the UE to be paged; and
    receiving a paging response message from the UE in response to the paging message,
    wherein one dedicated frequency band cell includes a plurality of tracking areas, each of the plurality of tracking areas including at least one non-dedicated frequency band cell,
    wherein the location information included in the paging message indicates one of the plurality of tracking areas where the UE to be paged is located,
    wherein the UE identifier included in the paging message is allocated on a tracking area basis, and the allocation allows identical UE identifiers in different tracking areas in a same dedicated frequency band cell,
    wherein whether the location information included in the paging message is identical to location information registered by the UE is determined by the UE, and
    wherein the paging response message is transmitted from the UE only when the UE determines that the location information included in the paging message is identical to the location information registered by the UE.

2. The method according to claim 1, wherein transmitting the paging message to the UE comprises transmitting the paging message in a different paging interval according to the location information included in the paging message.

3. The method according to claim 1, wherein the eNodeB transmits data associated with the service of the dedicated frequency band to the UE having information of a paging gap, and
    wherein the eNodeB suspends transmitting the data during an interval of the paging gap and transmits the paging message to the UE.

4. The method according to claim 3, wherein the information of the paging gap is transmitted to the UE through a Multicast Control Channel (MCCH) or an MBMS Scheduling Channel (MSCH).

5. A method of receiving a paging message at a User Equipment (UE) receiving a service of a dedicated frequency band in a wireless communication system, the method comprising:
    receiving, at the UE from an eNodeB, a paging message including a UE identifier and location information of the UE;
    determining whether the location information included in the paging message received by the UE is identical to location information registered by the UE; and transmitting a paging response message to the eNodeB only when the UE determines that the location information included in the paging message is identical to the location information registered by the UE, wherein one dedicated frequency band cell includes a plurality of tracking areas, each of the plurality of tracking areas including at least one non-dedicated frequency band cell, wherein the location information included in the paging message indicates one of the plurality of tracking areas where the UE to be paged is located, and wherein the UE identifier included in the paging message is allocated on a tracking area basis, and the allocation allows identical UE identifiers in different tracking areas in a same dedicated frequency band cell.

6. The method according to claim 5, further comprising checking system information of the dedicated frequency band and registering the location information of the UE when a location area included in the one dedicated frequency band cell does not include the registered location information.

7. The method according to claim 5, wherein:
the UE switches from the one dedicated frequency band cell for the service to the one non-dedicated frequency band cell according to a predetermined period; and
the UE checks whether the paging message has been received from the eNodeB over the one non-dedicated frequency band cell.

8. The method according to claim 7, wherein switching from the one dedicated frequency band cell to the one non-dedicated frequency band cell comprises transmitting information of the predetermined period to the eNodeB.

9. The method according to claim 7, wherein the predetermined period comprises information transmitted from the eNodeB to the UE.

10. The method according to claim 7, wherein the UE switches from the one dedicated frequency band cell to the one non-dedicated frequency band cell without receiving a Broadcast Channel (BCH).

11. The method according to claim 5, wherein:
the UE switches from the one dedicated frequency band cell for the service to the one non-dedicated frequency band cell during an interval of a paging gap; and
the UE checks whether the paging message has been received from the eNodeB over the one non-dedicated frequency band cell.

12. The method according to claim 11, wherein the paging gap is defined for each Multimedia Broadcast/Multicast Service (MBMS) service or each MBMS dedicated layer.

* * * * *